United States Patent [19]

Osawa et al.

[11] 3,873,588
[45] Mar. 25, 1975

[54] ORALLY ADMINISTRABLE PHARMACEUTICAL IRON PREPARATION

[75] Inventors: Yoshio Osawa, Yokohama; Koichiro Ueno, Tokyo; Koichi Dobashi, Kawasaki; Hideichi Asano, Yokohama, all of Japan

[73] Assignee: Teikoku Hormone Mfg. Co., Ltd., Tokyo, Japan

[22] Filed: Oct. 16, 1972

[21] Appl. No.: 297,741

Related U.S. Application Data

[63] Continuation-in-part of Ser. No. 77,352, Oct. 1, 1970, abandoned, which is a continuation-in-part of Ser. No. 555,284, June 6, 1966, abandoned.

[30] Foreign Application Priority Data

June 8, 1965   Japan.............................. 40-33677
Nov. 17, 1965  Japan.............................. 40-70174
Nov. 18, 1965  Japan.............................. 40-70531

[52] U.S. Cl. ...... 260/439 R, 260/80 L, 260/86.1 R, 260/429 J, 424/295
[51] Int. Cl. ............................................ C07f 15/02
[58] Field of Search ...................... 260/439 R, 429 J

[56] References Cited
UNITED STATES PATENTS 3,027,303  3/1962  Wolcott ............................... 424/78
3,632,637  1/1972  Martell ............................ 260/439 R Primary Examiner—Arthur P. Demers
Attorney, Agent, or Firm—Sherman & Shalloway

[57] ABSTRACT

An orally administrable pharmaceutical iron preparation having gradual release activity which comprises an iron salt of a carboxyl group-containing water-soluble linear polymer. The carboxyl group-containing water-soluble linear polymer which forms the anion component of the foregoing iron salt, is selected from the group consisting of 1. a polymer of at least one unsaturated monomer selected from the group consisting of acrylic acid and methacrylic acid, 2. a copolymer of maleic acid with at least one vinyl compound selected from the group consisting of vinyl acetate, a lower alkyl vinyl ether, acrylic acid, a lower alkyl ester of acrylic acid, methacrylic acid, a lower alkyl ester of methacrylic acid and vinyl alcohol, and 3. a copolymer of vinyl alcohol with an unsaturated monomer selected from the group consisting of acrylic acid and methacrylic acid.

6 Claims, No Drawings

ORALLY ADMINISTRABLE PHARMACEUTICAL IRON PREPARATION

This application is a continuation-in-part of co-pending application Ser. No. 77,352 filed on Oct. 1, 1970, now abandoned which is itself a continuation-in-part of application Ser. No. 555,284 filed on June 6, 1966 now abandoned.

The present invention relates to a new orally administrable iron preparation containing the iron ion in high concentration and in which the iron ion is gradually released by the self-action of an iron salt thereof. More specifically, this invention relates to an iron preparation consisting of iron salts of carboxyl group-containing water-soluble polymers.

A great number of iron salts such as ferrous sulfate, iron carbonate, iron alum, Mohr's salt, iron succinate, iron phthlate, ferric citrate and ferrous gluconate have been known in the past as therapeutic preparations for the treatment of anemia. These iron salts were however in all cases, whether inorganic or organic, salts of low molecular weight which, when subjected to the action of an acid liquid, such as gastric juice, were dissolved in a short period of time. Thus, since the iron ion was all released at the same time, these previous salts lacked the property of imparting their effect over a prolonged period, in consequence of which there was the need for frequent administration of the iron salt. In addition, they also had the defect that undesirable side effects were produced.

On the other hand, as is apparent from U.S. Pat. Nos. 3,074,852, 3,080,346 and 3,115,441, it has been generally known to combine or coat the active ingredients of medicaments with various plastics for controlling the dissolution of the active ingredients in the digestive tract.

A sustained release iron preparation of the above type has been prepared in which an inorganic iron salt has been embedded in the intercises of an insoluble foraminous plastic matrix. This type of iron preparation can be regarded as an advance over the foregoing salts in that it has imparted sustained release properties to inorganic iron salts. It has however been discovered that sustained release iron preparations produced undesirable side effects when administered to the human body. The plastics which have been used as the carrier in this type of preparation, not disintegrating in the digestive tract, remain intact in their original form as an insoluble mass to become adhered to the walls of the digestive tract, thereby resulting in serious consequences.

Further, even if it were possible to control the period in which the iron salt starts its dissolution in the digestive tract in the case of the preparation consisting of a low molecular weight iron salt which has been either coated or combined with a water-soluble organic polymeric material, once the iron starts dissolving, the whole amount thereof dissolves in a very short period of time, and therefore it is absolutely impossible to effect the gradual release of the iron ion.

U.S. Pat. No. 3,027,303 G. L. Wolcott discloses a pharmaceutical hematinic preparation comprising an iron salt of an acrylic acid polymer crosslinked with a sucrose ether having at least two hydroxyl groups. However, since this acrylic acid polymer is a water-insoluble crosslinked polymer, it leaves an insoluble viscous residue in the digestive tract and there is a fear that such residue affects adversely the activity of the digestive tract.

Accordingly, no heretofore-known technique has been able to provide an iron preparation wherein the iron salt itself possessed the property of gradually releasing the iron ion and in which the anion component of the iron salt was a water-soluble linear polymer. Such a product has now been developed in accordance with the present invention.

It is therefore an object of the present invention to provide an iron preparation which excels in moderate release and long-lasting properties while being devoid of shocks from iron, wherein the iron salt itself possesses the property of gradually releasing the iron ion, and in which the content of iron is at least equal to that of the conventional iron preparations.

Another object of this invention is to provide an iron preparation in which the anion component of the iron salt is composed of a carboxyl group-containing water-soluble linear polymer, and in which little, if any, side reactions are noted, since the polymer after having released its iron ion is finally discharged smoothly and safely from the digestive tract in a dissolved state.

A further object of this invention is to provide an iron preparation which can achieve pronounced therapeutic effects in the treatment of anemia even by a minimum number of oral administrations of the preparation, e.g., as little as one capsule per day.

A still further object of the present invention is to provide a method of preparing the foregoing iron preparation by which it can be prepared simply and without the need for any special equipment or operations.

Other objects and advantages of this invention will become apparent from the following, more detailed description thereof.

The foregoing objects are attained in accordance with this invention by an orally administrable pharmaceutical iron preparation having a gradual release activity which comprises an iron salt of a carboxyl group-containing water-soluble linear polymer. The carboxyl group-containing water-soluble linear polymer, which forms the anion component of the foregoing iron salt, is selected from the group consisting of (1) a polymer of at least one unsaturated monomer selected from the group consisting of acrylic acid and methacrylic acid, (2) a copolymer of maleic acid with at least one vinyl compound selected from the group consisting of vinyl acetate, a lower alkyl vinyl ether, acrylic acid, a lower alkyl ester of acrylic acid, methacrylic acid, a lower alkyl ester of methacrylic acid and vinyl alcohol, and (3) a copolymer of vinyl alcohol with an unsaturated monomer selected from the group consisting of acrylic acid and methacrylic acid.

The polymer (1) includes a homopolymer of acrylic acid or methacrylic acid and a copolymer of acrylic acid with methacrylic acid.

The copolymer (2) includes a copolymer of maleic acid with one vinyl compound selected from the above-mentioned group and a terpolymer of maleic acid with two vinyl compounds selected from the above-mentioned group.

The copolymer (3) includes a copolymer of vinyl alcohol with acrylic acid or methacrylic acid and a terpolymer of vinyl alcohol with acrylic acid and methacrylic acid.

In other words, selection of monomers to be used for the preparation of the polymer and combination thereof may be done optionally as long as the resulting polymer is water-soluble, and the process for the preparation of the polymer is not particularly critical and a customary method, e.g., bulk polymerization, granule polymerization and emulsion polymerization, may be adopted optionally. A terpolymer of maleic acid with acrylic acid and a lower alkyl ester of acrylic acid may be prepared by copolymerizing these three monomers each other at one time, or by forming a copolymer of maleic acid with a lower alkyl ester of acrylic acid and then partially hydrolyzing the copolymer.

As the lower alkyl vinyl ether to be used, there may be exemplified lower alkyl vinyl ethers in which the alkyl portion has 1 to 5 carbon atoms, such as methyl vinyl ether, ethyl vinyl ether, n- or iso-propyl vinyl ether, n-, iso-, sec- or tert-butyl vinyl ether, etc. The methyl vinyl ether is especially preferred. Further, lower alkyl esters of acrylic and meth-acrylic acids in which the alkyl portion has 1 to 5 carbon atoms, such as methyl, ethyl, n-propyl, iso-propyl, n-butyl, iso-butyl, sec-butyl and tert-butyl esters of acrylic and methacrylic acids, may be used. Use of methyl esters of acrylic and methacrylic acid is especially preferred.

Thus, according to this invention, the polymers which are suitably used include polyacrylic acid, polymethacrylic acid; coplymers of 40 to 90 mole % of acrylic acid and 60 to 10 mole % of methacrylic acid; copolymers of 10 to 50 mole % of maleic acid and 90 to 50 mole % of a vinyl compound selected from the group consisting of vinyl acetate, a lower alkyl vinyl ether, acrylic acid, a lower alkyl ester of acrylic acid, methacrylic acid, a lower alkyl ester of methacrylic acid and vinyl alcohol; and copolymers of 10 to 50 mole % of vinyl alcohol and 90 to 50 mole % of acrylic acid or methacrylic acid.

The "water-soluble" polymer referred to in this invention has the following solubility characteristics. When 1 g of the polymer is added to 1 liter of water, there is formed a transparent aqueous solution, which can pass through a filter paper on natural filtration. When said aqueous solution is subjected to the centrifugal separation under a gravity of 10,000 $\times$ g (acceleration of gravity), no precipitate is formed, and when the pH of said aqueous solution is varied within a range of from 1.0 to 13.0, precipitation or sedimentation is not substantially caused to occur. In other words, the polymer is kept substantially in solution form in either gastric juice having a pH of about 1.2 to about 2.0 or intestinal juice having a pH of about 8.

According to this invention, it is preferred in connection with the iron ion content and the sustained release action of the iron ion that the water-soluble polymer contains the carboxyl groups in an amount of 2 to 16 millimoles, preferably 5 to 16 millimoles, per gram of the polymer. If the content of the carboxyl groups of the polymer is less than 2 millimoles per gram, the content of bound iron becomes low, and the polymer also tends to become water-insoluble.

The molecular weight of the polymeric materials that are employed in accordance with the present invention can vary over fairly wide limits, although the degree of sustained release action depends somewhat upon the molecular weight of the polymeric component of the iron salts. Accordingly the high molecular weight water-soluble polymers which can be employed in accordance with the present invention generally are those which have molecular weights of several thousand up to several million, preferably from twenty thousand up to about one million. While such a molecular weight range is specified it is important to note that it is extremely difficult to measure the molecular weight of high polymers especially linear polymers having hydrophilic radicals. Accordingly as expressed in the specific examples of this application the molecular weight of the polymers employed are additionally set forth in terms of their specific or intrinsic viscosity.

In accordance with the present invention the optimum molecular weight of the polymeric material is selected depending upon the intended object of the polymeric iron salt. Thus, for example, when the iron release is to be increased so as to obtain a more immediate effect, the polymeric material can be one of comparatively low molecular weight. However when it is desired to have a very slow release effect a polymeric material of comparatively high molecular weight is preferably used.

The self-acting sustained release iron salts of this invention generally contain about 2.5 to about 33 percent by weight, based on said iron salts, of iron bound to the carboxyl group-containing water-soluble polymer. While it is in general preferred in the treatment of anemia that the content of iron is high, the salts containing 10 to 33 percent by weight of bound iron are especially preferred from a practical standpoint. This bound iron is characterized in that at least 50 percent by weight of the bound iron is bivalent. In general, the bivalent iron is absorbed in the digestive tract more rapidly than the trivalent iron. Accordingly, in the present invention it is preferred that at least 50 percent by weight, especially at least 70% by weight, of the bound iron is bivalent, and the content of the trivalent bound iron is as low as possible The orally administrable iron salt with self-acting sustained release action according to this invention is prepared by blending in an aqueous medium a carboxyl group-containing water-soluble polymer, either an alkali metal salt such as lithium, sodium or potassium salts, an ammonium salt thereof or a salt of an organic base such as an amine, e.g., trimethyl amine or triethyl amine, and an inorganic ferrous salt, following which the resulting iron salt of the polymer is collected as a solid.

In mixing the carboxyl group-containing polymer with the inorganic iron salt, the preferred procedure is to combine an aqueous solution of the polymer with an aqueous solution of 0.5 to 2.0 moles, especially 0.8 to 1.5 moles, per mole of said carboxyl group of an inorganic iron salt such as ferrous sulfate, ferrous chloride, ferrous bromide, ferrous nitrate, iron alum and Mohr's salt. Thus, generally when the system is neutral to alkaline, precipitation takes place immediately and a ferrous salt of the polymer is obtained in a solid state; however, when the system is acidic, the resulting ferrous salt of the polymer generally remains in its aqueous solution state.

In order to increase the content of the bivalent bound iron in the resulting iron salt of the polymer, it is preferred and important to maintain the pH value of the solution phase in the reaction mixture obtained by the reaction at a level ranging from 5.0 to 8.0.

Accordingly, where an aqueous solution of a free carboxyl group-containing water-soluble polymer is used in combination with a ferrous salt, it is possible to collect an iron salt containing the bivalent bound iron at a high content by adding at first an alkali to an aqueous solution of the polymer, then adding gradually the ferrous salt thereto, and blending the mixture to precipitate the iron salt of the polymer while adjusting the pH of the supernatant liquor within the above-mentioned range, or by adding a ferrous salt to an aqueous solution of the polymer, blending mixture and finally adding an alkali to the mixture to precipitate the iron salt of the polymer while adjusting the pH of the supernatant liquor within the above-mentioned range. As the alkali to be used in the above procedure there may be mentioned alkali metal hydroxides such as sodium hydroxide and potassium hydroxide, ammonia and highly basic organic amines such as triethyl amine.

Alternatively, an anion exchange resin can be used to extract foreign ions from the liquid mixture of the polymer and the ferrous salt. The anions, e.g., sulfate ion and chloride ion which are brought in by the inorganic iron salt, are absorbed by the anion exchange resin, after which either the solution can be concentrated under reduced pressure and dried to solids, or a water-miscible organic solvent such as an alcohol or ketone can be added to the solution, to form a ferrous salt of the carboxyl group-containing water-soluble polymer as a solid. It is also possible to add to the solution a neutral or lowly basic inorganic salt such as sodium chloride ammonium sulfate, potassium chloride and sodium hydrogen carbonate to thereby salt out a ferrous salt of the carboxyl group-containing water-soluble polymer as a solid precipitate.

Furthermore, when an aqueous solution of either an alkali metal salt, ammonium salt or organic base salt of the carboxyl group-containing water-soluble polymer is used with a ferrous salt, the pH of the mixture generally is maintained at neutral to alkaline when the inorganic iron salt is added so that the resulting ferrous salt of the polymer can be immediately isolated as a precipitate. However, in case the basicity of the salt of the polymer with the above base is low and the pH of the supernatant liquor of the reaction mixture after the reaction is without the above-mentioned range, it is recommended to add an alkali prior to or after addition of the ferrous salt to thereby precipitate the ferrous salt of the polymer.

The amount of the alkali necessary for adjusting the pH of the supernatant liquor obtained after the reaction within the range of from 5.0 to 8.0 can be easily determined by ordinary routine experiments. For instance, the relation between the amount of the alkali (NaOH) necessary for precipitation of a ferrous salt (PVMMA-Fe) of a 1:1 copolymer of vinyl methyl ether and maleic acid from the copolymer (PVMMA) and $FeSO_4 \cdot 7H_2O$ to the pH value of the supernatant liquor obtained after the precipitation of PVMMA-Fe is as shown in Table 1 given below.

Table 1

| Equivalent of NaOH to PVMMA | pH of Supernatant liquor after Precipiration | Amount (g) of formed PVMMA-Fe | Content (%) of Total Iron | Ratio (%) of Bivalent Iron to Total Iron |
|---|---|---|---|---|
| 0.50 | (4.35) | — | — | — |
| 0.70 | 5.10 | 1.05 | 16.0 | 92.0 |
| 0.90 | 5.66 | 1.43 | 19.7 | 91.1 |
| 1.00 | 6.56 | 1.48 | 20.8 | 84.7 |
| 1.10 | 6.62 | 1.60 | 21.3 | 74.9 |
| 1.20 | 6.70 | 1.62 | 23.2 | 64.2 |
| 1.50 | 7.50 | 1.81 | 22.6 | 54.0 |
| 1.70 | 8.10 | 1.70 | 21.3 | 20.0 |

The salt was synthesized from 1 g of PVMMA and 2.67 g (1.2 equivalents) of $Fe_2SO_4 \cdot mH_2O$ according to the method described in Example 3 given hereinbelow.

From the results shown in Table 1, it can be concluded that in order to obtain PVMMA-Fe of a high bivalent iron content in a good yield it is preferable to adjust the amount of NaOH to about 0.70 to about 1.50 equivalents to PVMMA.

The salt-forming reaction may be performed adequately in air, but it is preferable to conduct the reaction in an atmosphere of an inert gas such as nitrogen, helium or argon, because the content of the bivalent iron in the resulting iron salt tends to become higher. In case the reaction is effected with use of an ion exchange resin, since the operation in the air results in gelation, it is especially desirable to conduct the reaction in an inert gas atmosphere. The salt-forming reaction advances sufficiently at room temperature but it is possible to conduct the reaction at elevated temperatures or under cooling according to need. The reaction pressure may be atmospheric pressure, but an elevated pressure or reduced pressure may also be utilized according to need.

Collection of the resulting ferrous salt can be accomplished by customary procedures such as decantation and filtration, and the recovered ferrous salt is then dried.

Another important condition for obtaining an iron salt of a carboxyl group-containing water-soluble polymer in which at least 50% by weight of bound iron is bivalent is drying. The drying is effected at a temperature ranging from 60 to 120°C., preferably from 80° to 110°C. The drying may be effected in the air, but in order to avoid undesired oxidation, it is preferable to conduct the drying in an inert gas atmosphere. Especially when the iron salt is formed with use of an ion exhange resin, it is much desired to conduct the drying in vacuo or in an inert gas atmosphere.

Iron salts with self-acting sustained release action according to the present invention have, as illustrated in Table 2 given below, a high total iron content comparable to that of ferrous sulfate heretofore used as an iron preparation and also contain a very high bivalent iron ratio which is generally considered to give better results.

Table 2

| Iron Salt | Theoretical Total Iron Content (% by weight) | Total Iron Content (% by weight) Measured by Method Described in Examples | Ratio (%) of Bivalent Iron Content to Total Iron Content |
| --- | --- | --- | --- |
| $FeSO_4.7H_2O$ (pure) | 20.1 | — | — |
| Ferrous salt of vinyl methyl ether/maleic acid (1:1) copolymer | 24.5 | 20.5 | 85.8 |
| Ferrous salt of polyacrylic acid | 28.2 | 21.5 | 82.7 |
| Ferrous salt of polymethacrylic acid | 24.8 | 20.1 | 85.0 |
| Ferrous salt of maleic acid/acrylic acid (1:1) copolymer | 33.1 | 23.8 | 77.8 |

In contrast, the iron salt of a crosslinked acrylic acid polymer as disclosed in U.S. Pat. No. 3,027,303, to Wolcott has, as illustrated in Table 3 given below, a low total iron content and contains effective bivalent iron at a very low ratio.

Table 3

| Iron Salt | Theoretical Total Iron Content (% by weight) | Actual Total Iron Content (% by weight) | Ratio (%) of Bivalent Iron Content to Total Iron Content |
| --- | --- | --- | --- |
| Iron salt* of Carbopol No. 934 (trademark; B. F. Goodrich Chemical Co.) | 28.2 | 19.5 | 6.2 |
| Iron salt** of Carbopol No. 934 (trademark; B. F. Goodrich Chemical Co.) | 28.2 | 19.3 | 5.4 |

*synthesized according to the method described at column 2, lines 22 - 37 of U.S. Patent 3,027,303
**synthesized according to the method described at column 2, lines 38 - 42 of U.S. Patent 3,027,303

In addition, since iron preparations of this invention dissolve very slowly in acid liquids such as gastric juice or alkaline liquids such as intestinal juice, they release their iron ion over prolonged period of time. Hence, the rate of effective utilization of the iron ion is extremely high.

The most important feature of the iron salts of carboxyl group-containing water-soluble polymers of this invention is that the salt itself has the remarkable property of gradually releasing the iron ion and further that the anion component of the iron salt consists of a water-soluble linear polymer, so that the polymer, after having released the iron ion, remains behind in a state of a solution and thus does not in any way adversely effect the digestive tract.

Furthermore, the iron preparations of this invention have a high ferrous iron content and their substrate polymer is water-soluble. Therefore, they are readily and largely absorbed by the walls of the stomach and intestines as compared with iron preparations of the above-mentioned iron salts disclosed in U.S. Pat. No. 3,027,303. Thus, the iron preparations of this invention are very effective as remedies for anemia. The excellent absorbability of the iron preparations of this invention will be apparent from the following experimental results.

Iron preparations used in the experiments were synthesized in the following manner.

Iron Preparation of This Invention 5 ml of water was added to 500 mg. of PVMMA and dissolved therein. A solution of 270 mg. of NaOH in 5 ml of water was added to the above solution, and to the resulting solution was added under agitation a solution of 1.23 g of $FeSO_4.7H_2O$ ($Fe^{59}$: 500μci) in 5 ml of water. The resulting precipitate was wrapped with gauze and pressed to remove water therefrom. Then, the solid was dried by hot air maintained at 80 - 90°C., and ground in a mortar to obtain 620 mg of PVMMA-$Fe^{59}$.

Iron Preparation of U.S. Pat. No. 3,027,303 (Comparison)

50 ml of water was added to Carbopol No. 934 and a solution of 900 mg of $FeSO_4.7H_2O$ ($Fe^{59}$: 500 μci) in 10 ml of water was further added thereto. The mixture was agitated violently by a homogenizer and 0.81 ml of 28% aqueous ammonia was added dropwise to the mixture to adjust the pH to 8.5, following which 25 ml of methyl alcohol was added and the mixture was agitated violently for 2 minutes. The supernatant liquor was removed by centrifugal separation (3000 rpm × 5 minutes), and the precipitate was washed with 25 ml of methanol and 25 ml of ethanol and then dried at 120°C. for 4 hours to obtain 690 mg of an $Fe^{59}$ salt of Carbopol (which will be referred to as "CP-$Fe^{59}$" hereinbelow).

The ion salt absorption was evaluated by conducting the following oral administration test on rats.

Absorption Test

Groups of Wistar-Imamichi rats male 6 weeks old; body weight of 85–100.g), each group consisting of three rats, were made to fast (water was freely fed), and a suspension of about 100 γ, calculated as iron, of the iron salt in 1 ml of a physiological solution of sodium chloride was orally administered to the rats with use of a sound. The measurement of iron absorbed in blood was conducted by collecting 2 ml of blood from each rat 24 hours and 48 hours after the administration, counting the amount of the γ ray and calculating the total amount of iron absorbed in blood based on the assumption that the total amount of blood is one thirteenth of the body weight. The administration of the iron salt was effected at the point when it was attenuated to 4,000,000 c.p.m. per 100 γ iron. Results are shown in Table 4 given below.

ter-insoluble polymer is insoluble in water, it is impossible to remove the ion-exchange resin from the iron salt by a simple separation procedure. However, in the case of the present invention, since both an inorganic iron salt and a substrate polymer are water-soluble, it is possible to remove the ion-exchange resin from the reaction mixture containing the iron salt dissolved therein by a simple separation procedure such as decantation or filtration at the stage prior to precipitation of the iron salt of the water-soluble polymer.

As described hereinabove, the iron preparation of this invention does not exhibit any side effects and is excellent in self-acting sustained release action. The remarkable sustained release action of the iron preparation of this invention is evident from experimental results presented in Tables 5 and 6 given below. In this experiment, the ferrous salt of a vinyl methyl ether/maleic acid (1:1) copolymer (hereinafter referred to as Table 4

| Iron salt | Total iron content (% by weight) | Bivalent iron/total iron (%) | 24 Hours after administration | | | | 48 Hours after administration | | | |
|---|---|---|---|---|---|---|---|---|---|---|
| | | | Rate No. | Amount of iron administered (γ) | Amount of iron absorbed in total blood (γ) | (%) | Rate No. | Amount of iron administered (γ) | Amount of iron absorbed in total blood (γ) | (%) |
| PVMMA-Fe[59] | 19.8 | 83.1 | 1 | 101 | 2.86 | 2.83 | 7 | 113 | 3.28 | 2.90 |
| | | | 2 | 108 | 3.10 | 2.87 | 8 | 98 | 2.90 | 2.96 |
| | | | 3 | 112 | 2.09 | 1.87 | 9 | 115 | 2.61 | 2.27 |
| | | | average | | | 2.52 | average | | | 2.71 |
| CP-Fe[59] | 18.9 | 1.5 | 4 | 119 | 1.53 | 1.29 | 10 | 103 | 1.55 | 1.50 |
| | | | 5 | 103 | 1.82 | 1.77 | 11 | 107 | 1.90 | 1.78 |
| | | | 6 | 105 | 1.44 | 1.37 | 12 | 104 | 1.35 | 1.30 |
| | | | average | | | 1.48 | average | | | 1.53 |

As is apparent from the above test results, the iron preparation of this invention is much excellent over the conventional iron preparation with respect to the amount of iron absorbed in the blood.

Additionally, the iron preparation of this invention has the advantage that it can be prepared very easily. In the case of a crosslinked water-insoluble polymer disclosed in U.S. Pat. No. 3,027,303, when the polymer is suspended in an aqueous medium, the concentration cannot be raised because the viscosity of the polymer is extremely high, which results in operational troubles and difficulties. On the other hand, the polymeric material to be used in this invention is a water-soluble linear polymer and hence, such operational troubles or difficulties owing to the high viscosity are not brought about at all. Further, when an insoluble polymer is used, the salt-forming reaction becomes heterogeneous, and hence, the resulting salt is also heterogeneous and takes a gum-like form. Therefore, its handling involves difficulties. On the other hand, with use of the water-soluble polymer of the present invention, the reaction can be conducted while keeping the reaction mixture in the homogeneous state, and the resulting iron salt precipitated can be recovered in the form of a dry solid. Therefore, post treatments such as recovery and purification can be accomplished very easily.

Another advantage of the process for the formation of iron preparations according to this invention is that the above-mentioned ion-exchange method can be utilized. More specifically, in forming an iron salt of a water-insoluble polymer, when an ion-exchange resin is added and mixed, since the resulting iron salt of the wa- PVMMA-Fe; total iron content = 20.3% by weight; bivalent iron/total iron = 81.1%) and the ferrous salt of polyacrylic acid (total iron content = 22.3% by weight; bivalent iron/total iron = 90.1%) were added respectively in an amount equivalent to an Fe content of about 30 mg, to 100 ml of artificial gastric juice consisting of

| Sodium chloride | 2.0 | grams |
|---|---|---|
| Pepsin | 3.2 | do. |
| Dilute hydrochloric acid (10%) | 24.0 | ml |
| Purified water to make the whole amount | 24.0 | ml |

The amount of iron eluted into the artificial gastric juice was determined after a given period of time by the thiocyanide method. The results obtained are shown as compared with results for $FeSO_4 \cdot 7H_2O$.

Table 5

| Elution time (Min) | PVMMA-Fe (Fe 28.11 mg) | | $FeSO_4$ (Fe 29.80 mg) | |
|---|---|---|---|---|
| | Amount of Fe Released (mg/100 ml) | (%) | Amount of Fe Released (mg/100) | (%) |
| 5 | 1.48 | 5.26 | 29.75 | 99.8 |
| 15 | 2.67 | 9.50 | | |
| 30 | 3.00 | 10.67 | | |
| 45 | 4.11 | 14.62 | | |
| 60 | 5.06 | 18.00 | | |
| 90 | 7.78 | 27.67 | | |
| 120 | 10.45 | 37.17 | | |
| 180 | 10.67 | 37.95 | | |

Table 6

| Elution time (min) | Polyacrylic acid iron (Fe 30.18 mg) Amount of Fe Released (mg/100 ml) | Polyacrylic acid iron (Fe 30.18 mg) (%) | FeSO$_4$ (Fe 31.17 mg) Amount of Fe Released (mg/ml) | FeSO$_4$ (Fe 31.17 mg) (%) |
| --- | --- | --- | --- | --- |
| 5 | 0.99 | 3.28 | 31.08 | 99.7 |
| 15 | 4.14 | 13.7 | | |
| 30 | 4.97 | 16.5 | | |
| 45 | 5.67 | 18.8 | | |
| 60 | 8.10 | 26.8 | | |
| 90 | 10.88 | 36.1 | | |
| 120 | 13.65 | 45.3 | | |
| 180 | 17.17 | 56.9 | | |

Iron salts of PVMMA and polyacrylic acids prepared according to the process of this invention with use of an inorganic trivalent iron salt, in each of which all the bound iron was trivalent, were subjected to the same elution test as described above. The trivalent iron ion was hardly released in the case of these iron salts.

It can be appreciated from the foregoing results of Tables 5 and 6 that the iron salt of a carboxyl group-containing water-soluble polymer itself has the remarkable property of gradually releasing the iron ion. This indeed is an unexpected fact, as contrasted with the heretofore used low molecular weight iron salts, such as iron sulfate, which released their iron ion instantaneously and thus did not themselves possess any property of releasing the iron ion gradually. The reason for this is not fully known as yet, but it is believed that when the iron salt of the carboxyl group-containing water-soluble polymer is isolated from its solution as a solid, the iron salt of the polymer is obtained as particles in which the long main chains of the polymer become entangled and the side chain carboxyl groups are partially linked to carboxyl groups of other molecular chains via the iron ion, thus imparting to the polymeric iron salt its excellent sustained release action by gradually dissolving in small increments in an acid or alkaline water such as the gastrointestinal juices.

The iron salt of carboxyl group-containing water-soluble polymers according to this invention, in addition to their excellent sustained release property, also possess a desirable effect in that their residence time in the digestive tract is relatively long and the effective amount of the medicant absorbed by the body is extremely large.

PVMMA-Fe and ferrous sulfate marked with radioactive Fe isotope (Fe$^{59}$) were orally administered respectively to two groups of rats at a dose corresponding to 0.74 mg of iron content having 1,000,000 counts/min. The amount of iron based on the count detected in the duodenum and small intestine after a given number of hours as weight percentage of the amount of iron administered is shown in Table 7 below.

Table 7

| | Digestive Tract | | | |
| --- | --- | --- | --- | --- |
| Time hr | Duodenum PVMMA-$^{59}$Fe | Duodenum $^{59}$FeSO$_4$ | Small Intestine PVMMA-$^{59}$Fe | Small Intestine $^{59}$FeSO$_4$ |
| 3 | 16.44 % | 2.48 % | 17.45 % | 2.40 % |
| 8 | 3.08 % | 1.80 % | 0.50 % | 0.29% |

Further, the time to reach the maximum iron concentration in the large intestine and the amount of iron as weight percentage based on the amount administered are as follows:

| | Time | Amount |
| --- | --- | --- |
| PVMMA-$^{59}$Fe | 18 hrs | 3.15 % |
| $^{59}$FeSO$_4$ | 8 hrs | 2.34 % |

Further, when after similarly administering PVMMA-$^{59}$Fe and $^{59}$FeSO$_4$ orally, the amount of cumulative radioactivity detected in the excreta is shown in terms of count/min, this is as follows:

| | Fe (C.P.M.) | |
| --- | --- | --- |
| Time hr | $^{59}$FeSO$_4$ | PVMMA-Fe$^{59}$ |
| 9 | 88,000 | 74,000 |
| 12 | 188,000 | 138,000 |
| 18 | 486,000 | 163,000 |
| 24 | 508,000 | 203,000 |

It can be appreciated from the foregoing results that the iron salts of the carboxyl group-containing water-soluble polymers have an advantage over ferrous sulfate, the conventional iron preparation, with respect to the following points: (1) the residence time in the digestive tract is considerably longer; (2) the amount that resides in the duodenum and small and large intestines is greater; and (3) the amount of iron excreted as being noneffective is far less.

In light of the facts made known from the hereinbefore described in vivo and in vitro experiments, it can be appreciated that the iron preparation of this invention, as contrasted with the prior art iron preparations such as ferrous sulfate, resides in the digestive tract for a considerably longer time and releases its iron ion slowly and mildly and in a sustained manner. In addition, the amount of iron that is retained in the body is exceedingly great. Furthermore, since the iron preparation of this invention releases its iron ion in a sustained manner as well as slowly, side effects are hardly observed. This is in contradistinction to the case of the inorganic or organic low molecular weight iron salts which release their iron ion instantaneously. Furthermore, since the iron preparation of this invention gradually dissolves while releasing its iron ion, no adverse effects on the digestive tract can be observed, as contrasted with the case of the conventional iron preparations wherein the sustained release action of the iron ion has been imparted by means of a water-insoluble plastic coating or matrix.

In fact, as is apparent from the clinical examples which are fully described hereinafter, the iron preparation of this invention can achieve pronounced therapeutic effects in the treatment of such anemic disorders as hypochromic anemia, i.e., chloremia, primary hypochromic anemia, ground itch anemia and chronic hemorrhagic anemia, by an oral administration once daily of a small dosage of the preparation equivalent to 50-100 milligrams of iron. These remarkable effects are obtained without the attendance of any appreciable side effects.

The iron preparation of the present invention is used in any of the forms that are usually used for the oral administration of medicaments of this kind. For instance, it can be administered to the patients in the form of a tablet, granules, powder or a capsule. In manufacturing the preparation of this invention, there may be incorporated inert additives customarily used in the field of drug manufacture, such as excipients, e.g., lactose, dextran, crystalline cellulose and starch, binders, e.g., ethyl cellulose, polyvinyl pyrrolidone, polyvinyl alcohol and hyroxypropyl cellulose, lubricants, e.g., magnesium stearate, calcium stearate and talc, and disintegrators, e.g., calcium carboxymethyl cellulose. Further, in order to heighten the activity of the iron preparation of this invention, a substance which is non-toxic and has a reducing activity, such as vitamin C, may be incorporated. Accordingly the present invention can comprise the above-described iron salt with a pharmaceutically acceptable vehicle.

According to this invention, iron preparations having somewhat differing tendencies relative to their release of iron ions can be provided by varying over a broad range the molecular weight of the carboxyl group-containing water-soluble polymer, the content of the carboxyl groups and the composition of the polymer. For instance, if a preparation containing a polymer of relatively low molecular weight is used as the carboxyl group-containing water-soluble polymer, the preparation obtained is one which contains iron which is relatively rapid-acting. On the other hand, if a preparation containing a large amount of high molecular weight polymer is used, the resulting iron preparation is one whose release action is still more gradual over a more prolonged period. In either case however, the iron preparation of this invention can be distinguished from the prior art low molecular weight iron preparations by the fact that sustained release action is possessed by the iron salt itself.

According to this invention, an iron preparation can be prepared wherein, principally for reasons of economy, a low-cost rapid-acting iron salt is incorporated in the iron salt of the carboxyl group-containing water-soluble polymer in an amount such that no side effects will be produced. In particular when the polymer is of relatively high molecular weight, a balance is maintained between the rapid and sustained release actions to provide an effective iron preparation from the therapeutic standpoint.

The outstanding therapeutic effects of the iron preparation of this invention will become still more apparent from the following clinical examples.

a. As subjects of the clinical test, 52 hypochromic anemia patients (36 female and 16 male) were chosen, to whom the PVMMA-Fe preparation (total iron content = 19.5% by weight, bivalent iron/total iron = 78%) was administered. Iron deficiency in all cases was confirmed by sternal puncture observation. Further, a decline in serum iron was also noted in some of the cases.

The PVMMA-Fe preparation was administered orally once daily in a dosage corresponding to 100 mg of iron content.

The determination of the therapeutic effects of the medicament in treating hypochromic anemia was carried out by making comparisons of the hemoglobin level before and after treatment.

The results are shown in Table 8.

Table 8

Effect of PVMMA-Fe on Hemoglobin Level of Hypochromic Anemia

| Case No. | Days of treatment | Hemoglobin g/dl Before | After | Case No. | Days of treatment | Hemoglobin g/dl Before | After |
|---|---|---|---|---|---|---|---|
| 1 | 12 | 9.0 | 12.3 | 27 | 28 | 5.5 | 14.2 |
| 2 | 14 | 5.8 | 10.4 | 28 | 28 | 7.9 | 12.9 |
| 3 | 14 | 7.3 | 11.2 | 29 | 28 | 9.1 | 11.9 |
| 4 | 14 | 6.9 | 10.6 | 30 | 31 | 5.8 | 11.3 |
| 5 | 14 | 9.4 | 11.3 | 31 | 35 | 2.2 | 17.6 |
| 6 | 15 | 6.8 | 10.6 | 32 | 35 | 4.6 | 13.4 |
| 7 | 21 | 9.2 | 11.5 | 33 | 27 | 9.6 | 14.9 |
| 8 | 11 | 7.6 | 9.3 | 34 | 21 | 5.2 | 15.4 |
| 9 | 14 | 4.9 | 8.8 | 35 | 49 | 7.4 | 12.1 |
| 10 | 14 | 6.4 | 9.6 | 36 | 40 | 8.6 | 16.2 |
| 11 | 14 | 9.2 | 11.4 | 37 | 28 | 7.3 | 11.0 |
| 12 | 14 | 9.9 | 13.8 | 38 | 53 | 6.8 | 14.9 |
| 13 | 21 | 11.3 | 14.5 | 39 | 35 | 4.8 | 13.0 |
| 14 | 28 | 5.4 | 14.2 | 40 | 32 | 8.2 | 12.3 |
| 15 | 42 | 8.4 | 12.4 | 41 | 28 | 7.5 | 12.4 |
| 16 | 35 | 7.0 | 12.1 | 42 | 38 | 3.8 | 14.0 |
| 17 | 21 | 7.8 | 12.4 | 43 | 21 | 10.4 | 12.1 |
| 18 | 35 | 3.5 | 13.2 | 44 | 50 | 7.6 | 17.6 |
| 19 | 14 | 9.1 | 10.7 | 45 | 29 | 9.0 | 13.5 |
| 20 | 56 | 7.1 | 13.0 | 46 | 45 | 4.2 | 13.6 |
| 21 | 35 | 10.7 | 14.0 | 47 | 35 | 5.3 | 12.5 |
| 22 | 35 | 8.8 | 11.9 | 48 | 28 | 7.1 | 11.7 |
| 23 | 35 | 7.6 | 11.1 | 49 | 29 | 4.6 | 13.8 |
| 24 | 54 | 5.5 | 14.2 | 50 | 43 | 6.8 | 14.0 |
| 25 | 14 | 6.2 | 11.5 | 51 | 14 | 9.3 | 11.8 |
| 26 | 14 | 6.8 | 11.1 | 52 | 14 | 7.9 | 12.8 |
| Mean | | | | | 27.96 | 7.19 | 12.65 |

When the mean values in the foregoing table are considered, there is a definite increase in the hemoglobin level after administration, the value after administration being 12.7 g/dl, as compared with 7.2 g/dl before administration. The iron absorption and its storage by the administration of the preparation are thus proved. As the average number of days the preparation was administered was 28 days, the increase in hemoglobin per day amounts to 0.195 g/dl. This effect is comparable to the effect obtained when ferrous sulfate or ferrous citrate in an equal dosage (100–105 mg/day as iron) is administered two or three times a day.

Practically no side effects were observed among the 52 cases. A noteworthy fact was that cases Nos. 2, 10, 11, 25 and 34 were those in which various iron preparations were used in the past but had to be discontinued because of disturbance of the stomach. These cases exhibited no side effects at all when the preparation of the present invention was used. Of the 52 cases, there was only one case which complained of constipation during the period of treatment. It was not definite however whether this was due to the iron preparation of the present invention.

b. For purpose of comparison with other types of iron preparations, the percent of iron utilized for hemoglobin synthesis was calculated for 13 of the cases (cases Nos. 1–13). Employing the data shown in Table 9 for the calculation, the iron utilization rate was shown as the ratio of iron utilized for the hemoglobin compared to the total administered. The amount of blood was assumed to be 80 ml per kilogram of body weight. Thus, the calculation was as follows:

Fe-Utilization $$= \frac{80 \times \text{body weight} \times \frac{\text{increased Hb}}{100} \times \frac{56 \times 4}{68000}}{\text{total Fe dose}} \times 100$$

As shown in Table 9, the utilization rate was 26.5%. A comparison of this value with those of the other known iron preparations is presented in Table 10.

Thus, results were obtained indicating that the PVMMA-Fe preparation compares faborably with the other iron preparations in its iron utilization rate.

Table 9

Fe-Utilization Rate of PVMMA-Fe Administered to Anemia Patients

| Case No. | Name | Sex | Age | BW kg | Before Treatment | | | After Treatment | | Day of treatment | Fe Utilization (%) |
|---|---|---|---|---|---|---|---|---|---|---|---|
| | | | | | Hb* g/dl | RBC** x10⁴ | Se.Fe*** γ/dl | Hb* | RBC** | | |
| 1 | K. O. | ♀ | 46 | 51 | 9.0 | 360 | 30 | 12.3 | 470 | 12 | 37.0 |
| 2 | M. O. | ♀ | 38 | 38 | 5.8 | 334 | 45 | 10.4 | 448 | 14 | 33.0 |
| 3 | Y. K. | ♀ | 35 | 41 | 7.3 | 375 | | 11.2 | 428 | 14 | 30.2 |
| 4 | T. A. | ♀ | 28 | 52 | 6.9 | 355 | 62 | 10.6 | 482 | 14 | 36.0 |
| 5 | Y. M. | ♀ | 40 | 37 | 9.4 | 358 | 55 | 11.3 | 340 | 14 | 13.4 |
| 6 | S. M. | ♀ | 50 | 47 | 6.8 | 288 | 45 | 10.6 | 441 | 15 | 31.4 |
| 7 | S. K. | ♀ | 29 | 43.5 | 9.2 | 429 | | 11.5 | 512 | 21 | 12.5 |
| 8 | T. T. | ♀ | 52 | 55 | 7.6 | 393 | 42 | 9.3 | 392 | 11 | 22.3 |
| 9 | C. T. | ♀ | 22 | 43 | 4.9 | 221 | 30 | 8.8 | 340 | 14 | 31.6 |
| 10 | H. T. | ♀ | 37 | 45 | 6.4 | 300 | | 9.6 | 420 | 14 | 27.5 |
| 11 | M. T. | ♀ | 35 | 40 | 9.2 | 380 | | 11.4 | 430 | 14 | 16.5 |
| 12 | K. N. | ♀ | 29 | 47 | 9.9 | 407 | 60 | 13.8 | 480 | 14 | 34.4 |
| 13 | K. Y. | ♂ | 32 | 45 | 11.3 | 345 | 122 | 14.5 | 375 | 21 | 18.0 |
| | | | | | | | | | | mean | 26.5 |

* Hb — Hemoglobin
** RBC — Red Blood cell count
**** Se.Fe — Serum iron

Table 10

Comparison of Fe-Utilization of Various Iron Preparations

| Iron Preparation | No. of cases | Dose (mg/day) | Total Iron (mg/day) | Average of Hemoglobin Increase (1 day) (%) | Utilized Rate to Hemoglobin (%) |
|---|---|---|---|---|---|
| ferrous carbonate | 15 | 290 (4T) | 140 | 1.41 | 20.1 (226–540 mg) |
| ferrous gluconate | 14 | 1200 (12T) | 136 | 1.46 | 19.4 (192–577 mg) |
| ferrous citrate | 11 | 600 (6T) | 138 | 1.35 | 20.2 (216–647 mg) |
| ferrous glucuronate | 17 | 1200 (12T) | 134 | 1.48 | 21.2 (243–672 mg) |
| ferrous orotate | 15 | 1200 (12T) | 144 | 1.58 | 21.4 (182–815 mg) |
| ferrous fumalate | 18 | 400 (2T) | 132 | 1.35 | 20.4 (24.2–630 mg) |
| ferrous sulfate | 12 | 500 | 105 | 1.40 | 25.2 (230–650 mg) |
| PVMMA-Fe | 13 | 500 | 100 | 1.62 | 26.5 |

When the results of the foregoing clinical tests are summarized, it can be appreciated that the iron preparation of this invention has the following advantages over the prior art iron preparations.

1. The iron preparation of the present invention is effective in treating hypochromic anemia with the administration orally of a small dosage thereof. Furthermore, with respect to its rate of iron utilization, it demonstrates better results than those of conventional iron preparations.

2. The iron preparation of this invention comprises an iron salt which itself possesses an excellent sustained release action, and hence its administration once daily suffices, as contrasted with the conventional iron preparations which require administration 2 or 3 times daily. Thus, its use is more convenient. Furthermore, side effects such as iron shocks which are seen in the case of the conventional low molecular weight iron preparations are not at all observed.

3. Since the iron preparation of the present invention releases its iron mildly and finally dissolves, practically no side effects such as disorders of the digestive tract are noted. This is apparently due to the fact that a resin matrix does not adhere to the digestive tract.

The present invention is further illustrated by the following examples which are given for purpose of illustration and not in limitation of the invention. All percentages are on a weight basis unless otherwise indicated.

The total iron content and ferrous ion content referred to in the foregoing description and Examples given hereinbelow were measured according to the following methods.

1. Determination of Total Iron Content a. A sample (precisely weighed to 0.1 g) was dissolved in 3 ml of 8N-HCl and 1.5N-HCl was added thereto so that the volume of the liquor was 100 ml.

b. 7 ml of the liquor obtained in a above was incorporated under flowing water cooling with 1 ml of 3% ammonium persulfate and 3 ml of ammonium thiocyanate. After exactly 5 minutes had passed, the absorbance at 470 m$\mu$ was measured, and the measured value was compared with the absorbance at 470 m$\mu$ of the standard liquor. Based on the result of the comparison, the total iron content was calculated. The standard liquor used in the determination was prepared by dissolving 0.863 g, precisely weighed, of ammonium ferric sulfate in 1.5N-HCl to form a solution containing 5 $\gamma$/ml of iron.

2. Determination of Ferrous Ion Content 7 ml of the liquor obtained in (1 -a) above was incorporated under flowing water cooling with 1 ml of water and 3 ml of 10% ammonium thiocyanate, and after exactly 5 minutes had passed, the absorbance at 470 m$\mu$ was measured and the measured value was compared with the absorbance at 470 m$\mu$ of the standard liquor described above. Based on the result of the comparison, the ferric ion content was calculated. From the thus obtained values of the ferric ion content and the total iron content, the ferrous ion content was calculated according to the following formula:

ferrous ion content = (total iron content) − (ferric ion content)

The following water-soluble polymers were used in Examples:

1. vinyl methyl ether-maleic anhydride copolymer (Examples 1 to 7, 14 and 15)
2. vinyl acetate-maleic anhydride copolymer (Example 8)
3. acrylic acid-methacrylic acid ester copolymer amine salt and ammonium salt (Examples 9 and 10)
4. acrylic acid polymer (Examples 11 and 12)
5. methacrylic acid polymer (Example 13)
6. vinyl ethyl ether-maleic anhydride copolymer (Example 16)
7. vinyl isopropyl ether-maleic anhydride copolymer (Example 17)
8. vinyl n-butyl ether-maleic anhydride copolymer (Example 18)
9. vinyl alcohol-maleic acid copolymer (Example 19)
10. acrylic acid-maleic acid copolymer (Example 20)
11. methyl acrylate-maleic anhydride copolymer (Example 21)
12. ethyl acrylate-maleic anhydride copolymer (Example 22)
13. methyl methacrylate-maleic anhydride copolymer (Example 23)
14. methacrylic acid-maleic acid copolymer (Example 24)
15. methacrylic acid-vinyl alcohol copolymer (Example 25)

EXAMPLE 1

Five grams of a vinyl methyl ether-maleic anhydride (1:1) copolymer (PVMMA) having a specific viscosity of 1.0-1.4 as measured by 1 g of polymer in 100 ml methyl-ethylketone at 20°C, corresponding to an average molecular weight of 600,000–800,000 were added to 100 ml of water and heated and dissolved. To this solution a solution of 6.9 grams of $FeSO_4 7H_2O$ in 50 ml of water was added. When a solution of 3 grams of caustic soda in 50 ml of water was added with stirring, precipitates were formed. When the precipitates were collected by filtration and dried, 5.39 grams of a ferrous salt of a copolymer of vinyl methyl ether and maleic acid (PVMMA-Fe) were obtained. The total iron content was 22.2% ($Fe^{2+}$ content = 17.9%; $Fe^{2+}$/total Fe = 80.6%).

The amounts of the thus formed PVMMA-Fe saturatedly dissolved in artificial gastric juice and 0.5N-HCl were measured in the following manner.

The artificial gastric juice used in the measurement was prepared by passing argon through an aqueous solution containing 2.0 g/l of NaCl, 3.2 g/l of pepsin and 24.0 ml/l of 2.83N-HCl (pH = 1.2) to remove dissolved oxygen therefrom. Likewise, the 0.5N-HCl was treated with argon to remove oxygen. PVMMA-Fe was added to each of the above-mentioned artificial gastric juice and 0.5N-HCl is an amount indicated below, and argon was passed for 5 minutes to remove oxygen. Then, the liquid was shaken for 24 hours at a rate of 70 times per minute in a thermostat tank maintained at 36°C. and allowed to stand still at room temperature for 24 hours, following which the filtration was effected with use of filter paper No. 5 (manufactured by Toyo Roshi K.K.). 1 ml of the filtrate was taken and dried to solid. The amount of the solid residue was measured to determine the amount dissolved of PVMMA-Fe. Results are shown in Tables 11 and 12.

Table 11

Solubility of PVMMA-Fe in Artificial Gastric Juice

| Amount added of PVMMA-Fe (mg/cc) | pH of liquor 48 hours after addition of PVMMA-Fe | Appearance | Amount dissolved of PVMMA-Fe (mg/cc) |
|---|---|---|---|
| 1.00 | 1.27 | transparent | 1.00 |
| 2.00 | 1.29 | transparent | 1.56 |
| 10.00 | 1.51 | slightly precipitated | 5.45 |
| 20.00 | 2.51 | insoluble residue | 8.80 |
| 40.00 | 3.45 | insoluble residue | 8.85 |

Table 12

Solubility of PVMMA-Fe in 0.5N-HCl

| Amount added of PVMMA-Fe (mg/cc) | pH of liquor 48 hours after addition of PVMMA-Fe | Appearance | Amount dissolved of PVMMA-Fe (mg/cc) |
|---|---|---|---|
| 1.00 | 0.22 | transparent | 1.00 |
| 2.00 | 0.24 | transparent | 2.01 |
| 10.00 | 0.26 | transparent | 9.95 |
| 20.00 | 0.31 | insoluble residue | 19.84 |
| 40.00 | 0.44 | insoluble residue | 30.56 |

From the results shown above, it is seen that the saturation solubility of PVMMA-Fe in artificial gastric juice (pH after dissolution of PVMMA-Fe being about 3 to about 3.5) is about 8.8 to about 8.9 g per liter, and that the saturation solubility of PVMMA-Fe in 0.5N-HCl aqueous solution (pH after dissolution of PVMMA-Fe being about 0.35 to about 0.45) is about 20 to about 30 g per liter.

EXAMPLE 2

Five grams of the PVMMA of Example 1 were heated and dissolved in 100 ml of water, after which 6.9 grams of $FeSO_4·7H_2O$ dissolved in 50 ml of water were combined. When 4 ml of 28% ammonia water diluted with 50 ml of water were added with stirring, precipitates were formed. Upon separating the precipitates by filtering, followed by drying, 4.05 grams of a ferrous salt of a copolymer of vinyl methyl ether and maleic acid were obtained. The total iron content was 16.8% ($Fe^{2+}$ content = 14.3%; $Fe^{2+}$/total Fe = 85.1%).

EXAMPLE 3

One hundred grams of the PVMMA of Example 1 were heated and dissolved in 2 liters of water. After adding an aqueous solution of 50 grams of caustic soda in 200 ml of water to adjust the pH to about 10, one liter of an aqueous solution of 178 grams of $FeSO_4·7H_2O$ (1.0 equivalent) was added with stirring. The resulting precipitates were left standing for 5 minutes, collected by filtration, water-washed and dried to yield 124 grams of a ferrous salt of a copolymer of vinyl methyl ether and maleic acid. The total iron content was 23% ($Fe^{2+}$ content = 19.8%; $Fe^{2+}$/total Fe = 86.1%).

EXAMPLE 4

When 1.5 equivalents (267 grams) of the $FeSO_4·7H_2O$ were used as in Example 3, 126 grams of PVMMA-Fe having an total iron content of 23.9% were obtained ($Fe^{2+}$ content = 20.5%; $Fe^{2+}$/total Fe = 85.8%).

EXAMPLE 5

Five grams of the PVMMA of Example 1 were heated and dissolved in 100 ml of water, after which the pH of the solution was adjusted to about 8 by adding 10 ml of 5 N caustic soda. Then 50 ml of aqueous solution solution of 6.9 grams of $FeSO_4·7H_2O$ were added with stirring, whereupon a gel-like precipitate formed. When this was salted out by adding 50 ml of 20% NaCl, followed by filtration, water-washing and drying, 6.7 grams of a ferrous salt of a vinyl methyl ether-maleic acid copolymer were obtained. The total iron content was 10.4% ($Fe^{2+}$ content = 9.8%; $Fe^{2+}$/total Fe = 94.2%).

EXAMPLE 6

Five grams of the PVMMA of Example 1 were heated and dissolved in 100 ml of water, after which the pH of the solution was adjusted about 10 by adding 4.5 ml of 28% ammonia water. When 6.9 grams of $FeSO_4·7H_2O$ in solution in 50 ml of water were added with stirring, precipitates were formed. When the precipitates were filtered and dried, 5.89 grams of a ferrous salt of a vinyl methyl ether-maleic acid copolymer were obtained. The total iron content was 16.9% ($Fe^{2+}$ content = 14.3%; $Fe^{2+}$/total Fe = 84.6%).

EXAMPLE 7

Five grams of the PVMMA of Example 1 were heated and dissolved in 100 ml of water, after which the solution was adjusted to a pH of about 10 by adding 10 ml of triethylamine. This was followed by the addition with stirring of 6.9 grams of $FeSO_4·7H_2O$ dissolved in 50 ml of water to form a gel-like precipitate. When 50 ml of 20% saline solution were added to the solution, the precipitates separated from the solution. When they were collected by filtration, washed with water and dried, 6.3 grams of a ferrous salt of a copolymer of vinyl methyl ether and maleic acid were obtained. The total iron content was 17.1% ($Fe^{2+}$ content = 14.0%; $Fe^{2+}$/total Fe = 81.9%).

EXAMPLE 8

Two grams of a copolymer of vinyl acetate and maleic anhydride (1:1) having an intrinsic viscosity in methanol of about 0.8, corresponding to an average molecular weight of 300,000–500,000 were dissolved in 50 ml of water, after which a solution of 3.02 grams of $FeSO_4·7H_2O$ in 20 ml of water were added thereto. After adding 10 ml of Amberlite IR 45 (Polystyrene base polyamine type anion exchanger, weakly basic, bead form, 20 to 50 mesh particle size; see The Condensed Chemical Dictionary, fifth edition, 1889–1952, Maruzen Asian Edition, page 56) to this solution and stirring for 1 hour, the resin was separated therefrom by filtration. When the filtrate was evaporated and dried, 3.7 grams of a ferrous salt of a copolymer of vinyl acetate and maleic acid were obtained. The total iron content was 10.3% ($Fe^{2+}$ content = 7.2%; $Fe^{2+}$/total Fe = 69.9%).

EXAMPLE 9

Eight grams of an amine salt of a vinyl copolymer containing 15% by weight of acrylic acid and 85% by weight of higher and lower esters of methacrylic acid having an intrinsic viscosity, of about 1.8 as measured by 1g of polymer in 5% ethyl alcohol at 25°C., corresponding to an average molecular weight of about 36,000, were dissolved in 100 ml of water, to which were dropped 20 ml of 50% aqueous solution of $FeSO_4·7H_2O$ to form precipitates. When the precipitates were collected by filtration, washed with water and dried, 7.37 grams of a ferrous salt of the foregoing copolymer were obtained. The total iron content was 5.6% ($Fe^{2+}$ content = 4.3%; $Fe^{2+}$/total Fe=76.8%).

EXAMPLE 10

Example 9 was repeated but using instead of the amine salt of the copolymer described an ammonium salt thereof, with the consequence that 6.58 grams of a ferrous salt of said copolymer were obtained. The total iron content was 3% ($Fe^{2+}$ content = 2.8%; $Fe^{2+}$/total Fe=93.3%).

EXAMPLE 11

Forty ml of an aqueous solution of 1.73 grams of polyacrylic acid having an intrinsic viscosity of 0.5–0.6 as measured by an aqueous solution of the sodium salt at 20°C., corresponding to an average molecular weight of 2,000,000–3,000,000 and 20 ml of an aqueous solution of 6.67 grams of $FeSO_4·7H_2O$ were combined, after which 24 ml of 1 N caustic soda were gradually added to form precipitates. When the precipitates were collected by filtration and dried, 2.04 grams of a ferrous polyacrylate were obtained. The total iron content was 29% ($Fe^{2+}$ content = 20.7%; $Fe^{2+}$/total Fe = 71.4%).

EXAMPLE 12

1.06 grams of polyacrylic acid having an intrinsic viscosity of 0.3–0.4 as measured by an aqueous solution of the sodium salt at 20°C., corresponding to an average molecular weight of 1,000,000–1,500,000 were dissolved in 40 ml of water, which solution was then neutralized by adding 14.7 ml of 1 N caustic soda. To this solution 2.05 grams of $FeSO_4 \cdot 7H_2O$ in solution in 25 ml of water were added to form precipitates. The precipitates were washed with water and dried to yield 1.59 grams of a ferrous polyacrylate. The total iron content was 26% ($Fe^{2+}$ content = 21.5%; $Fe^{2+}$/total Fe = 82.7%)

EXAMPLE 13

Forty ml of a 4.6% aqueous solution of polymethacrylic acid having an intrinsic viscosity of 0.8–0.9, corresponding to an average molecular weight of 100,000–150,000 were neutralized by adding 1 N caustic soda, after which 20 ml of an aqueous solution containing 5.81 grams of $FeSO_4 \cdot 7H_2O$ were added thereto to form precipitates. The precipitates were washed with water and dried to yield 2.44 grams of a ferrous polymethacrylate. The total iron content was 11.5% ($Fe^{2+}$ content = 7.8%; $Fe^{2+}$/total Fe=67.8%).

EXAMPLE 14

One hundred grams of a copolymer of vinyl methyl ether and maleic anhydride (1:1) (PVMMA) having a specific viscosity of 1.5–2.0 as measured by 1 g of polymer in 100 ml of methylethylketone at 20°C., corresponding to an average molecular weight of 800,000–1,000,000 were added to one liter of water and heated, thereby resulting in a clear aqueous solution by hydrolysis. After cooling this aqueous solution to room temperature, a solution of 178 grams of $FeSO_4 \cdot 7H_2O$ in 400 ml of water was added thereto. After adding one liter of a swelled resin of Amberlite IR 45 to this mixture and stirring for 1 hour, the resin was separated by filtration. The resin was washed with water, after which the filtrate and wash liquid were combined and then diluted with water to a 4-liter solution and poured into 20 liters of acetone to obtain a brown precipitate.

The precipitate was collected by filtration and dried at reduced pressure to yield 141 grams of a ferrous salt of a copolymer of vinyl methyl ether and maleic acid as a brown powder. The total iron content analyzed 24.4% ($Fe^{2+}$ content = 24.4%; $Fe^{2+}$/total Fe = 75.8%).

EXAMPLE 15

One hundred grams of the PVMMA of Example 14 were added to 2 liters of water and rendered into an aqueous solution by heating, after which a solution of 178 grams of $FeSO_4 \cdot 7H_2O$ in 500 ml of water and further 1.3 liters of Amberlite IR 45 were added. The mixture was then stirred for 30 minutes.

After separating the resin by filtration, water was added to the filtrate to make the liquid quantity 4 liters, after which 84 grams of Avicel (microcrystalline cellulose) were added, thereby obtaining a suspension which was poured into 20 liters of acetone to obtain a light brown precipitate.

The precipitate was collected by filtration and dried under reduced pressure to yield 246 grams of a powder consisting of Avicel and a ferrous salt of a copolymer of vinyl methyl ether and maleic acid which were homogeneously mixed. Analyzed total Fe = 11.6% ($Fe^{2+}$ content = 7.8%; $Fe^{2+}$/total Fe = 67.2%).

EXAMPLE 16

5 Grams of a vinyl ethyl ether-maleic anhydride (1:1) copolymer were added to 100 ml of water and heated and dissolved. To this solution a solution of 2.5 grams of caustic soda in 50 ml of water was added. When a solution of 9.9 grams of $FeSO_4 \cdot 7H_2O$ in 50 ml of water was added with stirring, precipitates were formed. When the precipitates were collected by filtration and dried, 7.10 grams of a ferrous salt of a copolymer of vinyl ethyl ether and maleic acid were obtained. The total iron content was 19.8% ($Fe^{2+}$ content = 16.1%; $Fe^{2+}$/total Fe = 81.3%).

EXAMPLE 17

5.0 grams of a vinyl isopropyl ether-maleic anhydride (1:1) copolymer were added to 100 ml of water and heated and dissolved. To this solution a solution of 2.4 grams of caustic soda in 50 ml of water was added. When a solution of 9.1 grams of $FeSO_4 \cdot 7H_2O$ in 50 ml of water was added with stirring, precipitates were formed. When the precipitates were collected by filtration and dried, 6.35 grams of a ferrous salt of a copolymer of vinyl isopropyl ether and maleic acid were obtained. The total iron content was 17.7% ($Fe^{2+}$ content = 11.3%; $Fe^{2+}$/total Fe = 73.8%).

EXAMPLE 18

5 Grams of a vinyl n-butyl ether-maleic anhydride (1:1) copolymer were added to 100 ml of water and heated and dissolved. To this solution a solution of 2.3 grams of caustic soda in 50 ml of water was added. When a solution of 8.4 grams of $FeSO_4 \cdot 7H_2O$ in 50 ml of water was added with stirring, precipitates were formed. When the precipitates were collected by filtration and dried, 6.51 grams of a ferrous salt of a copolymer of vinyl n-butyl ether and maleic acid were obtained. The total iron content was 19.0% ($Fe^{2+}$ content = 16.2%; $Fe^{2+}$/total Fe = 85.3%).

EXAMPLE 19

5 Grams of a vinyl alcohol maleic acid (1:1) copolymer were added to 100 ml of water and heated and dissolved. To this solution a solution of 2.5 grams of caustic soda in 50 ml of water was added. When a solution of 10.6 grams of $FeSO_4 \cdot 7H_2O$ in 50 ml of water was added with stirring, precipitates were formed. When the precipitates were collected by filtration and dried, 5.13 grams of a ferrous salt of a copolymer of vinyl alcohol and maleic acid were obtained. The total iron content was 17.9% ($Fe^{1+}$ content = 15.5%; $Fe^{2+}$/total Fe = 96.6%).

EXAMPLE 20

5 Grams of a acrylic acid-maleic acid (1:1) copolymer were added to 100 ml of water and heated and dissolved. To this solution a solution of 2.7 grams of caustic soda in 50 ml of water was added. When a solution of 11.0 grams of $FeSO_4 \cdot 7H_2O$ in 50 ml of water was added with stirring, precipitates were formed. When the precipitates were collected by filtration and dried, 6.52 grams of a ferrous salt of a copolymer of acrylic acid and maleic acid were obtained. The total iron content was 23.8% ($Fe^{2+}$ content = 23.8%; $Fe^{2+}$/total Fe = 77.8%).

EXAMPLE 21

5 Grams of a methyl acrylate maleic anhydride (1:1) copolymer were added to 100 ml of water and heated and dissolved. To this solution a solution of 2.3 grams of caustic soda in 50 ml of water was added. When a solution of 6.9 grams of $FeSO_4 \cdot 7H_2O$ in 50 ml of water was added with stirring, precipitates were formed. When the precipitates were collected by filtration and dried, 5.45 grams of a ferrous salt of a copolymer of methyl acrylate and maleic acid were obtained. The total iron content was 18.5% ($Fe^{2+}$ content = 16.8%; $Fe^{2+}$/total Fe = 90.8%).

EXAMPLE 22

5 Grams of an ethyl acrylate maleic anhydride (1:1) copolymer were added to 100 ml of water and heated and dissolved. To this solution a solution of 1.6 grams of caustic soda in 50 ml of water was added. When a solution of 6.5 grams of $FeSO_4 \cdot 7H_2O$ in 50 ml of water was added with stirring, precipitates were formed. When the precipitates were collected by filtration and dried, 5.36 grams of a ferrous salt of a copolymer of ethyl acrylate and maleic acid were obtained. The total iron content was 16.3% ($Fe^{2+}$ content = 15.0%; $Fe^{2+}$/total Fe = 92.0%).

EXAMPLE 23

Two grams of a copolymer of methyl methacrylate and maleic anhydride (1:1) were dissolved in 100 ml of water, after which a solution of 2.60 grams of $FeSO_4 \cdot 7H_2O$ in 20 ml of water were added thereto. After adding 10 ml of Amberlite IR 45 (polystyrene base polyamine type anion exchanger, weakly basic; bead form, 20 to 50 mesh particle size; see *The Condensed Chemical Dictionary*, fifth edition, 1889–1952, Maruzen Asian Edition, page 56) to this solution and stirring for 1 hour, the resin was separated therefrom by filtration. When the filtrate was evaporated and dried, 2.6 grams of a ferrous salt of a copolymer of methyl methacrylate and maleic acid were obtained. The total iron content was 15.3% ($Fe^{2+}$ content = 13.3%; $Fe^{2+}$/total Fe = 86.9%).

EXAMPLE 24

To 50 ml of an aqueous solution of 2.0 grams of a copolymer of methacrylic acid and maleic acid (7:3) having a viscosity in water of about 400–800 cps were added 40 ml of an aqueous solution of 4.30 grams of $FeSO_4 \cdot 7H_2O$, following which 10 ml of Amberlite IR 45 were added to the foregoing solution, which was then stirred for 1 hour. When the resin was separated by filtration and the filtrate was evaporated, dried and solidified, 2.15 grams of a ferrous salt of a copolymer of methacrylic acid and maleic acid were obtained. The total iron content was 20.6% ($Fe^{2+}$ content = 15.4%; $Fe^{2+}$/total Fe = 74.8%).

EXAMPLE 25

5 grams of a methacrylic acid — vinyl alcohol copolymer were added to 100 ml of water and heated and dissolved. To this solution a solution of 1.6 grams of caustic soda in 50 ml of water was added. When a solution of 6.4 grams of $FeSO_4 \cdot 7H_2O$ in 50 ml of water was added with stirring, precipitates were formed. When the precipitates were collected by filtration and dried, 5.2 grams of a ferrous salt of a copolymer of methacrylic acid and vinyl alcohol were obtained. The total iron content was 17.3% ($Fe^{2+}$ content = 15.1%; $Fe^{2+}$/total Fe = 87.3%).

Formation of tablets, granules and capsules containing the iron preparation of this invention will now be described by reference to Examples.

EXAMPLE 26

Tablets having the following formulation were prepared;

| Ingredients | Amount (mg in one tablet) |
| --- | --- |
| PVMMA-Fe (total iron content = 20.0 % by weight; $Fe^{2+}$/total Fe = 78.3 %) | 250 |
| Lactose (excipient) | 100 |
| Ethyl cellulose (binder) | 7 |
| Talc (lubricant) | 3.5 |
| Total | 360.5 |

Preparation Method

PVMMA-Fe was mixed with lactose, and 10% solution of ethyl cellulose in ethanol was added to the mixture. The resulting mixture was granulated, and granules having a size within a prescribed range were collected and blended with talc. Then the blend was formed into tablets of a 10.5 mm diameter by means of a tablet-molding machine.

EXAMPLE 27

Granules having the following formulation were prepared:

| Ingredients | Amount (mg in one pack) |
| --- | --- |
| PVMMA-Fe (total iron content = 20.0 % by weight; $Fe^{2+}$/total Fe = 78.3 %) | 500 |
| Crystalline cellulose (excipient) | 100 |
| Polyvinyl pyrrolidone (binder) | 12 |
| Total | 612 |

Preparation Method

PVMMA-Fe was blended with crystalline cellulose, and a 10% solution of polyvinyl pyrrolidone in ethanol was added to the mixture. Then, the mixture was granulated in the same manner as in Example 26 and granules having a size within a prescribed range were collected. The granules were packed in paraffin paper packs by means of a packing machine.

EXAMPLE 28

Capsules having the following formulation were prepared:

| Ingredients | Amount (mg in one capsule) |
| --- | --- |
| PVMMA-Fe (total Fe content = 20.0 % by weight; $Fe^{2+}$/total Fe = 78.3 %) | 500 |
| Crystalline cellulose (excipient) | 100 |
| Polyvinyl pyrrolidone (binder) | 12 |
| Total | 612 |

Preparation Method

PVMMA-Fe was mixed with crystalline cellulose, and a 10% solution of polyvinyl pyrrolidone in ethanol was added to the mixture. The blend was granulated in the same manner as in Example 26 and granules having a size within a prescribed range were collected, following which the granules were filled in gelatine capsules.

EXAMPLE 29

Powder having the following formulation was prepared:

| Ingredients | Amount (mg in one pack) |
| --- | --- |
| PVMMA-Fe (total Fe content = 20.0 % by weight; $Fe^{2+}$/total Fe = 78.3 %) | 500 |
| Lactose | 250 |
| Starch | 250 |
| Total | 1000 |

Preparation Method

PVMMA-Fe powder, lactose and starch were well mixed in a mixing machine, and the mixture was packed in paraffin paper packs by means of a packing machine.

What is claimed is:

1. An orally administrable pharmaceutical iron preparation having a gradually iron-releasing activity which consisting essentially of an iron salt of a water-soluble linear polymer containing from 2 to 16 millimoles of carboxylic groups per gram of the polymer, said salt containing bound iron in an amount of from about 2.5 to about 33% by weight based on the weight of the salt, said polymer being selected from the group consisting of (1) a polymer of at least one unsaturated monomer selected from the group consisting of acrylic acid and methacrylic acid, (2) a copolymer of maleic acid with at least one vinyl compound selected from the group consisting of vinyl acetate, a lower alkyl vinyl ether, acrylic acid, a lower alkyl ester of acrylic acid, methacrylic acid, a lower alkyl ester of methacrylic acid and vinyl alcohol, and (3) a copolymer of vinyl alcohol with an unsaturated monomer selected from the group consisting of acrylic acid and methacrylic acid, and at least 50% by weight of said bound iron being bivalent.

2. The pharmaceutical iron preparation of claim 1 wherein said water-soluble linear polymer is a copolymer composed of 40 to 90 mole % of acrylic acid and 60 to 10 mole % of methacrylic acid.

3. The pharmaceutical iron preparation of claim 1 wherein said water-soluble linear polymer is a copolymer composed of 10 to 50 mole % of maleic acid and 90 to 50 mol % of a vinyl compound selected from the group consisting of vinyl acetate, a lower alkyl vinyl ether, acrylic acid, a lower alkyl ester of acrylic acid, methacrylic acid, a lower alkyl ester of methacrylic acid and vinyl alcohol.

4. The pharmaceutical iron preparation of claim 1 wherein said water-soluble linear polymer is a copolymer composed of 10 to 50 mole % of vinyl alcohol and 90 to 50 mole % of acrylic acid or methacrylic acid.

5. A method of preparing an orally administrable iron salt having a sustained iron-releasing activity and being free of a resin insoluble in gastric juice or intestinal fluid, which comprises mixing in an aqueous medium a water-soluble inorganic iron salt with a water-soluble linear polymer containing 2 to 16 millimoles of carboxylic groups, said polymer being selected from the group consisting of (1) a polymer of at least one unsaturated monomer selected from the group consisting of acrylic acid and methacrylic acid, (2) a copolymer of maleic acid with at least one vinyl compound selected from the group consisting of vinyl acetate, a lower alkyl vinyl ether, acrylic acid, a lower alkyl ester of acrylic acid, methacrylic acid, a lower alkyl ester of methacrylic acid and vinyl alcohol, and (3) a copolymer of vinyl alcohol with an unsaturated monomer selected from the group consisting of acrylic acid and methacrylic acid, and thereafter separating the resulting iron salt of said linear polymer as a solid by a procedure selected from:

a. maintaining the pH of the resulting mixture at 5.0–8.0,
   b. evaporating to dryness the resulting mixture after removing foreign anions by means of an anion exchange resin,
   c. adding a water-miscible organic solvent to the resulting mixture after removing foreign anions by means of an anion exchange resin,,
   d. salting out the resulting mixture after removing foreign anions by means of an anion exchange resin,
   e. or a combination of two or more of the above.

6. A method according to claim 5 wherein said iron salt of the linear polymer is dried at a temperature of from 60° to 120°C.

* * * * *